(12) United States Patent
Chefson

(10) Patent No.: US 10,454,742 B2
(45) Date of Patent: Oct. 22, 2019

(54) METHOD FOR DETECTING RADIOELECTRIC TRANSMITTERS AND ASSOCIATED DEVICE

(71) Applicant: AVANTIX, Aix en Provence (FR)

(72) Inventor: Loic Chefson, Aix-en Provence (FR)

(73) Assignee: AVANTIX, Aix en Provence (FR)

( * ) Notice: Subject to any disclaimer, the term of this patent is extended or adjusted under 35 U.S.C. 154(b) by 0 days.

(21) Appl. No.: 16/229,849

(22) Filed: Dec. 21, 2018

(65) Prior Publication Data

US 2019/0199568 A1 Jun. 27, 2019

(30) Foreign Application Priority Data

Dec. 27, 2017 (FR) ..................................... 17 01385

(51) Int. Cl.
*H04L 27/26* (2006.01)
*H04L 1/00* (2006.01)
(52) U.S. Cl.
CPC .......... *H04L 27/265* (2013.01); *H04L 1/0036* (2013.01)
(58) Field of Classification Search
CPC .. H04B 17/0085; H04B 17/10; H04B 17/102; H04B 17/12
See application file for complete search history.

(56) References Cited

U.S. PATENT DOCUMENTS 9,245,433 B1 * 1/2016 Butler ................... H04W 4/029
2011/0053646 A1 * 3/2011 Kundmann ............ H01Q 3/267
455/562.1

FOREIGN PATENT DOCUMENTS

WO WO 2015/024827 A1 2/2015

OTHER PUBLICATIONS

Search Report as issued in French Patent Application No. 1701385, dated Oct. 10, 2018.
Badawy, A., et al., "Estimating the number of sources in white Gaussian noise: simple eigenvalues based approaches," IET Signal Processing, vol. 11, No. 6, Aug. 2017, XP006062686, pp. 663-673.
Saraç, U., et al., "Detection and Localization of Emitters in the Presence of Multipath Using a Uniform Linear Antenna Array," Sensor Array and Multichannel Signal Processing Workshop, Jul. 2008, XP031312365, pp. 419-422.

* cited by examiner

*Primary Examiner* — Kevin Kim
(74) *Attorney, Agent, or Firm* — Pillsbury Winthrop Shaw Pittman LLP

(57) ABSTRACT

A method for detecting the presence of one or more radioelectric transmitters in an environment, the method being implemented by a device including a computing unit and an antenna array including a plurality of antennas able to carry out acquisitions simultaneously from the environment in the form of acquisition signals during an acquisition time and to receive and to transmit simultaneously the acquisition signals in digital form to the computing unit.

11 Claims, 5 Drawing Sheets

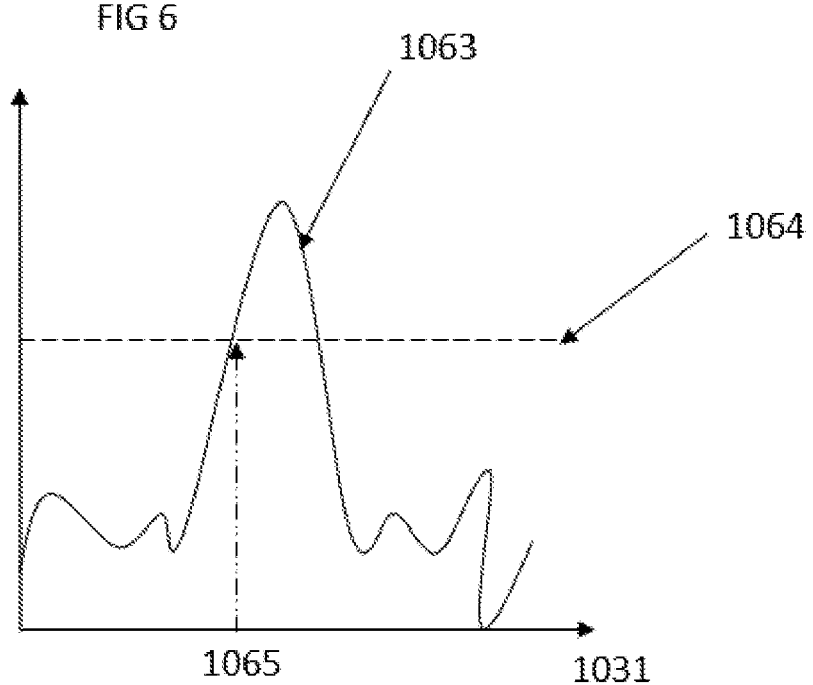

METHOD FOR DETECTING RADIOELECTRIC TRANSMITTERS AND ASSOCIATED DEVICE

CROSS-REFERENCE TO RELATED APPLICATIONS

This application claims priority to French Patent Application No. 1701385, filed Dec. 27, 2017, the entire content of which is incorporated herein by reference in its entirety.

FIELD

The technical field of the invention is that of the detection of radioelectric transmitters.

The present invention in particular relates to a method for detecting radioelectric transmitters implemented by a device comprising an antenna array with simultaneous acquisition. The present invention also relates to a device, a computer program product and a recording support for the implementation of such a method.

BACKGROUND

Conventional detection algorithms detect radioelectric transmitters by studying the power of the signal received by an acquisition device comprising one or more antennas. Indeed, in the absence of transmitters, the value of the power of the received signal is lower than in the presence of a transmitter and thus, by choosing a suitable threshold, it is possible to detect the presence of a transmitter by thresholding the power of the received signal.

The algorithms combine this study of the power of the received signal with a frequency analysis by computing the spectrum of the received signal. In the presence of a transmitter, a frequency peak appears on the spectrum and it is thus possible to detect the presence of a transmitter.

However, if two transmitters have transmitted radioelectric waves at very close instants and at very close frequencies, a single power peak and a single frequency peak will be visible and it will be impossible to discriminate the two transmitters.

There thus exists a need to detect in a received signal all the transmitters having transmitted radioelectric waves over the acquisition time of the acquisition device and thus to discriminate a plurality of transmitters having transmitted radioelectric waves at very close instants and at very close frequencies.

SUMMARY

An aspect of the invention offers a solution to the aforementioned problems by making it possible to discriminate a plurality of transmitters that transmit at very close instants and at very close frequencies, that is to say which cannot be discriminated in time or frequency.

A first aspect of the invention relates to a method for detecting the presence of one or more radioelectric transmitters in an environment, the method being implemented by a device including a computing unit and an antenna array including a plurality of antennas able to carry out acquisitions simultaneously from the environment in the form of acquisition signals during an acquisition time and to receive and transmit simultaneously the acquisition signals in digital form to the computing unit, the computing unit being able to carry out processings on the digitised signals, the method comprising the following different steps:

For each antenna,
   Receiving and digitising the acquisition signal in the form of a digitised signal and transmitting the digitised signal to the computing unit;
   Generating a plurality of spectra from the digitised signal having a chosen frequency resolution, a spectrum comprising a plurality of points, each point being assigned to a number called bin;
the method including the following steps:
For each bin, grouping together the spectra of the different antennas corresponding to the bin and computing a covariance matrix;
Grouping together the covariance matrices of which the associated spectra correspond to a same time block, a time block being defined as a sub-time of the acquisition time, to form block covariance matrices;
Computing a first measurement of co-linearity of the block covariance matrices between two consecutive time blocks and a second measurement of co-linearity of the block covariance matrices between two consecutive bins of a same time block;
Detecting one or more radioelectric transmitters by carrying out the following steps:
   For each bin, computing the product between the first and the second measurement of co-linearity to form a co-linearity product;
   For each time block:
      Noting the number of start bins for which the co-linearity product passes above a threshold, that is to say that the value of the co-linearity product for a start bin is above the threshold and the value of the co-linearity product for the bin preceding this start bin is below the threshold;
      The number of start bins gives the number of radioelectric transmitters detected in the time block.

Thanks to the invention, the position information of each transmitter is integrated within the detection method. Indeed, the generation of a plurality of spectra from the digitised signal of an antenna makes it possible to construct a time-frequency diagram or spectrogram which gives the amplitude and the phase of the digitised signal of the antenna for each time-frequency box. A spectrogram is constructed for each antenna and each transmitter produces different amplitude and phase results on the different spectrograms as a function of its position and its orientation with respect to the antenna array. The relative differences in amplitude and in phase between the different spectrograms are modeled by the covariance matrices. Thus, by constructing a spectrogram of covariance matrices which gives the covariance matrix for each time-frequency box, since the size of the time-frequency boxes has been adjusted so that a transmitter occupies several time-frequency boxes on the spectrogram of covariance matrices, and that the covariance matrices of the time-frequency boxes of the transmitter are stable between each other, it is possible to detect the transmitter by quantifying the stability of the covariance matrix between neighbouring time-frequency boxes, in particular by focusing on high values of co-linearity according to the first and the second co-linearity measurements, that is to say along the time axis and the frequency axis of the spectrogram of block covariance matrices. By this method, it is then possible to discriminate two transmitters that transmit at very close instants and at very close frequencies, that is to say two transmitters which partially overlap in time and in frequency, if the directions of arrival of the radioelectric waves that they transmit are sufficiently far apart, that is to say if the two transmitters can be discriminated spatially.

Apart from the characteristics that have been described in the preceding paragraph, the detection method according to a first aspect of the invention may have one or more additional characteristics among the following, considered individually or according to all technically possible combinations thereof.

Beneficially, the step of generating spectra of the detection method according to a first aspect of the invention comprises the following sub-steps:

Splitting the digitised signal into a plurality of windows, so as to form digitised sub-signals;

For each digitised sub-signal, computing a discrete Fourier transform to obtain a spectrum.

Thus, a plurality of spectra of the digitised signal of an antenna is generated, which is going to make it possible to construct a time-frequency diagram or spectrogram of the antenna indicating for each time-frequency box the amplitude and the phase of the corresponding digitised sub-signal.

Beneficially, the step of generating spectra of the detection method according to a first aspect of the invention comprises a pre-processing sub-step to format the digitised signal before the splitting sub-step.

Thus, this makes it possible to condition the digitised signals so that they are well formatted before carrying out the computing steps.

Beneficially, in the sub-step of splitting the digitised signal of the detection method according to a first aspect of the invention, each window overlaps a part of the preceding window.

Thus, information given by the spectrogram overlaps between different neighbouring time-frequency boxes, which makes it possible to obtain better temporal resolution without modifying the frequency resolution and to attenuate the effects of a potential sub-step of weighting the digitised sub-signals.

Beneficially, the step of generating spectra of the detection method according to a first aspect of the invention comprises a sub-step of weighting the digitised sub-signals before the computation of the discrete Fourier transforms of each digitised sub-signal.

Thus, this makes it possible to condition the digitised sub-signals so that they are well formatted before application of the discrete Fourier transforms, for example to counter a phenomenon of spectral leakage.

Beneficially, the block covariance matrices of the detection method according to a first aspect of the invention are formed by averaging the values of the covariance matrices corresponding to a same time block.

Thus, the signal to noise ratio is improved by constructing the time-frequency diagram of block covariance matrices rather than the time-frequency diagram of covariance matrices.

Beneficially, the first measurement of co-linearity of the detection method according to a first aspect of the invention is a normalised scalar product measurement between the block covariance matrix of a first time block and the block covariance matrix of a second time block, the second time block being the time block following the first time block.

Beneficially, the second measurement of co-linearity of the detection method according to a first aspect of the invention is a normalised scalar product measurement between the block covariance matrix of a first bin and the block covariance matrix of a second bin, the second bin being the bin following the first bin in a same time block.

Thus, since a transmitter occupies several time-frequency boxes on the spectrogram of block covariance matrices, it is sought to quantify the stability of the block covariance matrix between neighbouring boxes, which is equivalent to studying the co-linearity. The first co-linearity measurement quantifies the co-linearity along the time axis of the spectrogram of block covariance matrices and the second co-linearity measurement quantifies the co-linearity along the frequency axis of the spectrogram of block covariance matrices. The definitions of the first and the second co-linearity measurements make it possible to obtain simple measurements with values comprised between 0 and 1, 1 signifying that the block covariance matrices are perfectly co-linear and thus that they are linked to a same transmitter.

Beneficially, the value of the chosen threshold for the detection step of the detection method according to a first aspect of the invention depends on the chosen frequency resolution and on the acquisition sub-time corresponding to a time block.

Thus, the threshold depends on the dimensions of the time-frequency boxes of the spectrogram of block covariance matrices. The larger the boxes, the more difficult it is to discriminate the transmitters from ambient noise and thus the higher the threshold is in order to guard against false alarms, that is to say detections triggered by noise.

A second aspect of the invention relates to a device enabling the implementation of the detection method according to a first aspect of the invention characterised in that it comprises:

An antenna array comprising a plurality of antennas able to receive simultaneously and to digitise acquisition signals to transmit them to a computing unit in the form of digitised signals;

A computing unit able to carry out computation and detection functions on the digitised signals.

A third aspect of the invention relates to a computer program product including instructions which, when the programme is run on a computer, lead the computer to implement the method according to a first aspect of the invention.

A fourth aspect of the invention relates to a non-transitory computer readable medium that can be read by a computer including instructions which, when they are run on a computer, lead the computer to implement the method according to a first aspect of the invention.

The invention and its different applications will be better understood on reading the description that follows and by examining the figures that accompany it.

BRIEF DESCRIPTION OF THE FIGURES

The figures are presented for indicative purposes and in no way limit the invention.

FIG. 6 illustrates the thresholding of the co-linearity product.

DETAILED DESCRIPTION

Unless stated otherwise, a same element appearing in the different figures has a single reference.

A first aspect of the invention relates to a method 100 for detecting the presence of one or more radioelectric transmitters 300 in an environment close to a device 200 according to a second aspect of the invention, enabling the implementation of the detection method 100. Environment is taken to mean an angular coverage zone corresponding to a cone of revolution having for axis a given direction, which may be any direction emanating from the device 200. For example, if the device 200 is air-borne, the device 200 defines a horizon plane separating the space into two half-spaces, a first half-space containing the ground and a second half-space containing the sky. By taking an angle of 0° in any direction contained in the horizon plane, the cone of revolution has for example an opening between 15° and 80° in the first half-space for each direction emanating from the device 200.

Hereafter, the terms radioelectric transmitter or transmitter will indiscriminately be used to designate an electronic telecommunications equipment that transmits signals in the form of electromagnetic waves. These signals may be for example broadcasting programmes for radio or television, PMR (Professional Mobile Radio) signals, satellite telephony signals, a telephone conversation or instead a radar remote sensing pulse.

Figure 1:
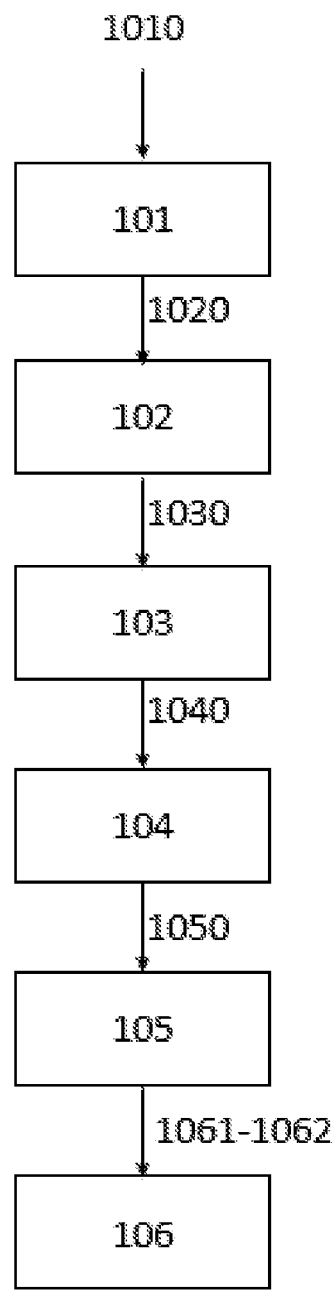
FIG. 1 shows a schematic representation of the method according to a first aspect of the invention.
Figure 2:
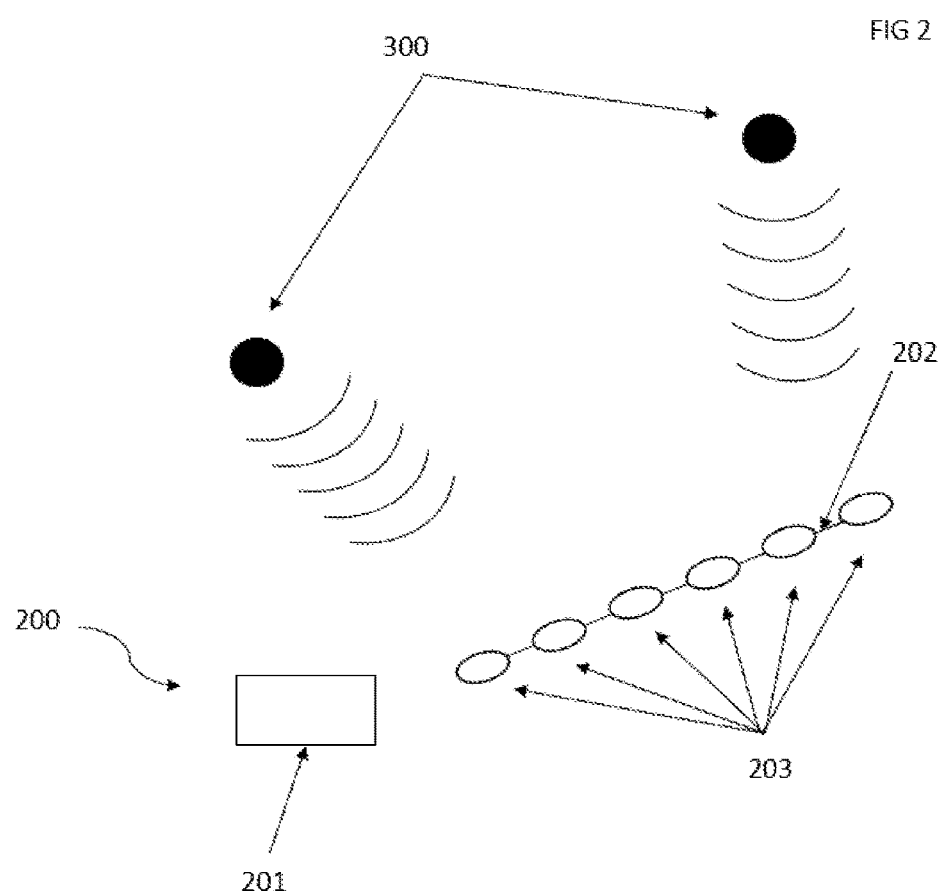
FIG. 2 shows a schematic representation of the device according to a second aspect of the invention.

The method 100 according to a first aspect of the invention comprises several steps of which the sequencing is represented in FIG. 1. These steps are implemented by the device 200 according to a second aspect of the invention, represented in FIG. 2. The device 200 may be used on any type of carrier, land-borne, sea-borne or air-borne. The device 200 comprises a computing unit 201 carrying out the computation steps 102 to 106 of the method 100 and an antenna array 202 carrying out the step 101 of acquisition and digitisation.

The antenna array 202 comprises a plurality of antennas 203 that capture at the same time acquisition signals 1010 coming from the close environment during an acquisition time 1011, that is to say that each antenna 203 receives a different acquisition signal 1010 but that the acquisition is triggered simultaneously for all the antennas 203. The acquisition time 1011 is the same for all the antennas 203. Antenna 203 is taken to mean a device comprising an antenna element capable of capturing signals from its environment and a digital-analogue converter capable of digitising a signal. The acquisition signal 1010 received by each antenna 203 is next digitised in such a way that all the acquisition signals 1010 received by the antennas 203 are digitised simultaneously. After digitisation, each antenna 203 transmits the digitised signal 1020 obtained after digitisation of the acquisition signal 1010 to the computing unit 201. In the present application, the computing unit sends back to a device having a memory and computing and detection functions on the digitised signals 1020.

The capacity of the method 100 to detect and to separate the transmitters 300 is closely linked to the design of the antenna array 202. The antenna array is of variable dimension. The number of antennas 203 of the antenna array 202 is variable. In an embodiment, the number of antennas 203 of the antenna array 202 is greater than or equal to 6. The antenna array may for example be within a circumference of one metre.

After reception of the digitised signals 1020, the computing unit 201 implements the computation steps 102 to 106 of the method 100. The computing unit may carry out beforehand a pre-processing step making it possible to condition the digitised signals 1020 so that they are well formatted before application of the computations. This pre-processing step comprises one or more sub-steps. The pre-processing step may for example comprise three sub-steps, a sub-step of interpolation of the digitised signals 1020 by a factor of two, then a sub-step of filtering the digitised signals 1020 by a low pass filter, then a sub-step of decimation of the digitised signals 1020 by a factor of three.

Figure 3:
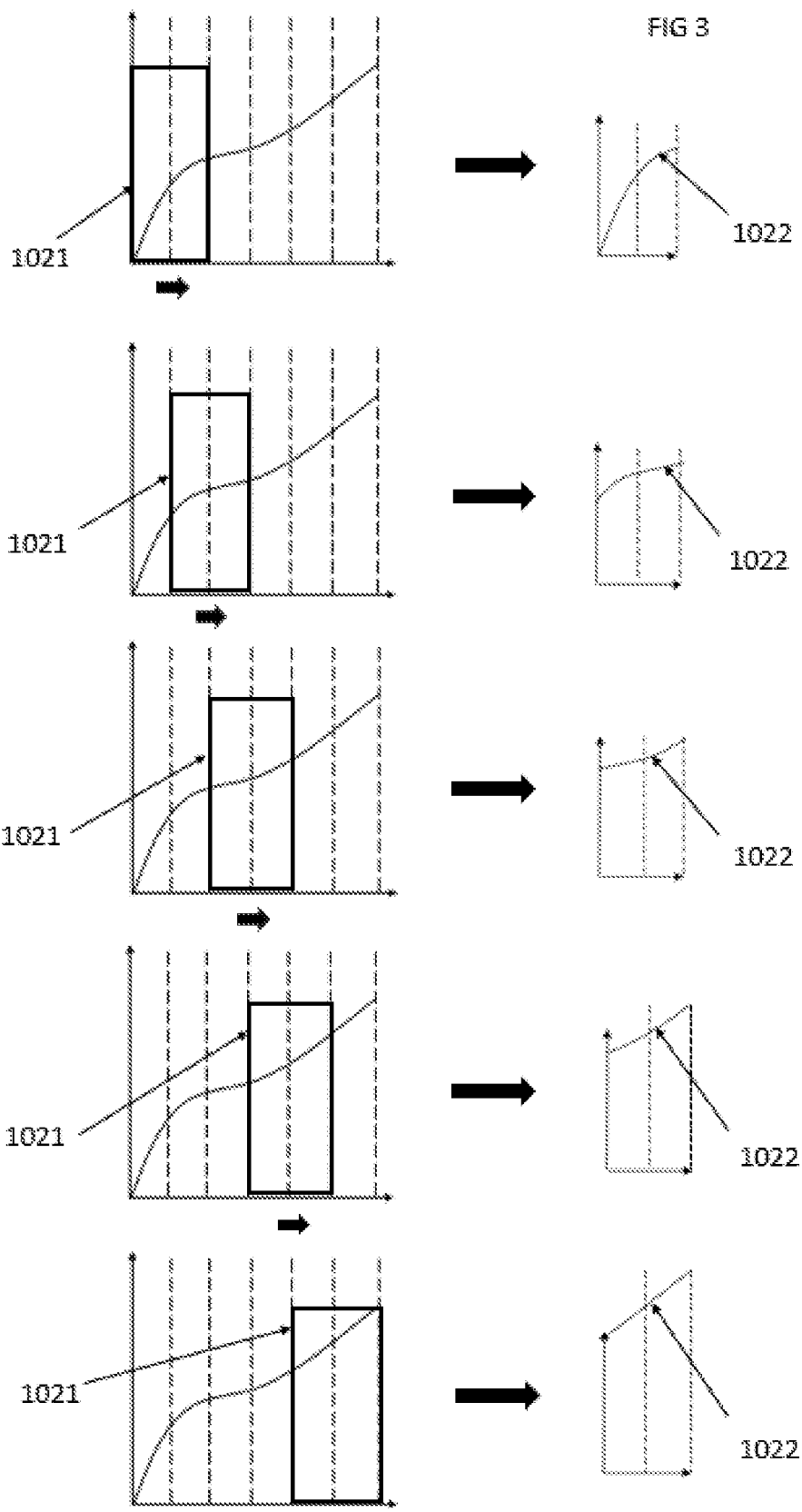
FIG. 3 illustrates the sub-step of splitting a digitised signal into digitised sub-signals.

The step 102 of generating spectra 1030 consists in computing a series of spectra 1030 on the digitised signal 1020 of each antenna 203. Spectrum 1030 is taken to mean the diagram that associates with each frequency an intensity or a power. The number of spectra 1030 is chosen as a function of a chosen frequency resolution 1032 and of the acquisition time 1011: in an embodiment, the acquisition time 1011 corresponds to a whole number of spectra 1030. The spectra 1030 are computed by application of a discrete Fourier transform or FFT on the discrete digitised signal 1020 of an antenna 203: a FFT requires a certain number of points N of the digitised signal 1020 in order for the computation to be possible. To compute i spectra, the digitised signal 1020 is split into i sub-signals 1022 containing the number of points N required for the computation of the FFT. In an embodiment, the spectra 1030 are computed with a time overlap and in an embodiment with a time overlap of a half, that is to say that the first half of a sub-signal 1022 is equal to the second half of the preceding sub-signal 1022. The principle of splitting the digitised signal 1020 into sub-signals 1022 with an overlap of a half is represented in FIG. 3. A window 1021 is taken having a size along the x-axis of two times the number of points N required for the computation of the FFT. The window is placed at the start of the digitised signal 1020 and the digitised signal 1020 contained in the window 1021 is extracted to produce a sub-signal 1022. The window 1021 is next made to slide by a half-size of window 1021 along the x-axis and the digitised signal 1020 contained in the window 1021 is extracted to produce another sub-signal 1022. This is started over again until the end of the digitised signal 1020. At the end of the splitting, there are i sub-signals 1022 of the digitised signal 1020 to which the FFT is going to be applied. Before applying the FFT, it is possible to apply a weighting window to the sub-signals 1022 to condition them and to counter a phenomenon of spectral leakage. Phenomenon of spectral leakage is taken to mean dispersion of the power of a signal over several frequencies adjacent to the frequency of the signal and which thus falsifies the frequency analysis.

Figure 4:
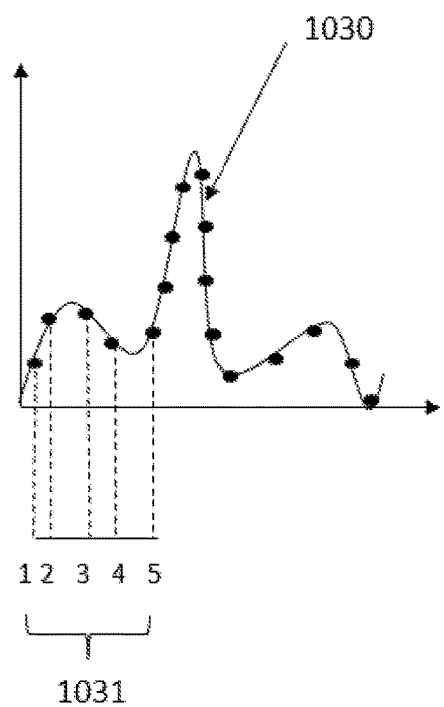
FIG. 4 shows a spectrum illustrating the notion of bin.

Each sub-signal 1022 is going to give rise to a spectrum 1030 which is computed in a discrete manner by the FFT, that is to say that for each point of the discrete sub-signal 1022, a point of the spectrum 1030 is computed. As illustrated in FIG. 4, the points of the spectrum are numbered with whole numbers and these whole numbers are called bins 1031.

Thus, the value X(k) of bin n° k is computed in the following manner:

$$X(k) = \sum_{n=1}^{N} x(n) * \exp\left(-j\frac{2\pi(k-1)(n-1)}{N}\right)$$

With x(n) the value of the n-th point of the sub-signal 1022 and N the number of points of the sub-signal 1022.

A spectrum of the sub-signal 1022 comprising N bins 1031 is thereby obtained. This operation is carried out for each sub-signal 1022 of the digitised signal 1020 then for each digitised signal 1020 of each antenna 203. Thus, if the device 200 comprises A antennas 203, A×i spectra 1030 and A×i×N bins 1031 are obtained.

It is next possible to represent a time-frequency diagram or spectrogram for each antenna. A spectrogram indicates for each bin 1031 and each spectrum 1030 the amplitude and the phase of the acquisition signal 1010, delimiting time-frequency boxes. These amplitudes and these phases are a function of the position and the orientation of the antennas 203 vis-à-vis the transmitters 300. The frequency resolution 1032 makes it possible to define the size in frequency of the time-frequency boxes of the spectrogram.

After having generated the spectra 1030, the computing unit 201 carries out the step 103 of computing covariance matrices 1040. To do so, the spectra 1030 of the different antennas 203 of a same bin 1031 are grouped together within a vector. For example, the spectra 1030 of the bin n° 4 of the sub-signal n° 8 of each antenna 203 are grouped together within a vector V. If, for example, the device 200 comprises 5 antennas 203, the vector V contains 5 spectra and is expressed thus:

$$V(8, 4) = \begin{bmatrix} Spec_{Ant1}(8, 4) \\ Spec_{Ant2}(8, 4) \\ Spec_{Ant3}(8, 4) \\ Spec_{Ant4}(8, 4) \\ Spec_{Ant5}(8, 4) \end{bmatrix}$$

With Spec designating the spectrum and Ant designating the antenna.

As many vectors as bins 1031 are thereby obtained, namely A×i×N vectors.

If Cov designates the covariance matrix 1040 of the vector V, its computation is expressed thus:

$$Cov(m, k) = V(m, k) \times V^T(m, k)$$

With $V^T$ designating the conjugate transpose of V, m the number of the sub-signal 1022 and k the number of the bin 1031.

Each bin 1031 thus obtains a covariance matrix 1040 that is associated therewith. Each covariance matrix 1040 translates the relative differences in amplitude and in phase between the different spectra 1030 contained in the vector V having served to compute it.

The step 104 of computing the block covariance matrices 1050 consists in grouping together the covariance matrices 1040 corresponding to sub-signals 1022 belonging to a same time block 1051. A time block 1051 is defined as a sub-time of the acquisition time 1011, that is to say a time less than the acquisition time 1011, extracted from the acquisition time 1011. A time block 1051 is for example a quarter of the acquisition time 1011. In an embodiment, this sub-time is rounded off to correspond to a whole number of spectra 1030, that is to say to a whole number of sub-signals 1022. In an embodiment, over the acquisition time 1011, the number of time blocks 1051 is always greater than or equal to four. In an embodiment, the spectra straddling two time blocks 1051 are not taken into account in the computation of the block covariance matrices 1050.

For a given time block 1051, a certain number of sub-signals 1022 are defined. These sub-signals 1022 are associated with spectra 1030 having bins 1031 for which the covariance matrices 1040 have been computed. All these covariance matrices 1040 are grouped together within a block covariance matrix 1050 $Cov_{bloc}$ defined as follows:

$$Cov_{block}(mblock, k) = \frac{1}{B} \sum_{m \in block} Cov(m, k)$$

With B a coefficient, m the number of the sub-signal 1022 and k the number of the bin 1031.

B is for example the number of spectra 1030 per block rounded up to the power of 2.

Figure 5:
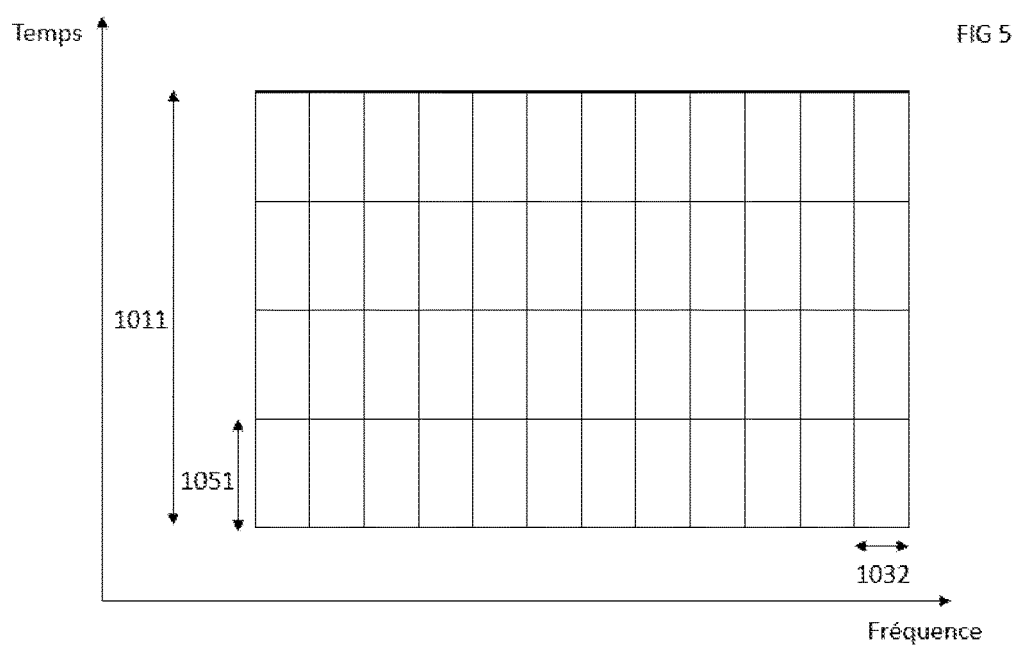
FIG. 5 shows the splitting into time-frequency boxes of the time-frequency diagram of a block covariance matrix.

The block covariance matrix 1050 is an averaged version of the covariance matrices 1040 over a time block 1051. It is now possible to construct a spectrogram of block covariance matrices indicating the value of the block covariance matrix for each time-frequency box. This operation by time block 1051 makes it possible to improve the signal to noise ratio of the spectrogram of block covariance matrices 1050 compared to a spectrogram of covariance matrices 1040. The time block 1051 makes it possible to define the size in time of the time-frequency boxes of the spectrogram of block covariance matrices and the frequency resolution 1032 makes it possible to define the size in frequency of the time-frequency boxes of the spectrogram of block covariance matrices. The time-frequency boxes of the spectrogram of block covariance matrices are represented in FIG. 5. The values of the time block 1051 and the frequency resolution 1032 are chosen so that the transmitters occupy several time-frequency boxes on the spectrogram of block covariance matrices. Indeed, the detection principle used in the method 100 exploits the fact that the signals generated by the transmitters 300 have a spatial coherence greater than that of ambient noise, that is to say that the stability between two neighbouring block covariance matrices associated with a transmitter signal 300 are more stable between each other than two neighbouring block covariance matrices associated with noise. It is thus no longer possible to discriminate a transmitter from ambient noise if it occupies a single time-frequency box. Generally speaking, the greater the size of the time-frequency boxes, the more noise becomes coherent spatially because averaged over the time-frequency box, and the more it is difficult to detect the transmitters 300. It is thus desirable to choose the size of the time-frequency boxes so that the block covariance matrices 1050 of the time-frequency boxes associated with noise are considered non co-linear.

It is then possible to seek to quantify the stability of the block covariance matrix 1050 between neighbouring time-frequency boxes of the spectrogram of block covariance matrices. Neighbouring block covariance matrices 1050 that are stable between them are indicative of the presence of a transmitter 300. The efficiency of the method 100 is maximum when the speed of the transmitters is less than 50 km/h.

Mathematically, the stability reflects the percentage of co-linearity between neighbouring block covariance matrices 1050. During the co-linearity measurement step 105, a first co-linearity measurement 1061 is computed between two block covariance matrices 1050 having two neighbouring time blocks 1051 on the spectrogram of block covariance matrices 1050 and a second co-linearity measurement 1062 between two block covariance matrices 1050 having two neighbouring bins 1031 within a same time block 1051 on the spectrogram of block covariance matrices 1050. The first co-linearity measurement 1061 makes it possible to quantify the co-linearity of the block covariance matrices along the time axis and the second co-linearity measurement 1062 makes it possible to quantify the co-linearity of the block covariance matrices along the frequency axis. The first 1061 and the second co-linearity measurements 1062 are for example normalised scalar products defined as follows:

$$\text{measurement}_1(mblock, k) = \frac{\langle Cov_{block}(mblock, k) \mid Cov_{block}(mblock+1, k) \rangle}{\|Cov_{block}(mblock, k)\| \|Cov_{block}(mblock+1, k)\|}$$

$$\text{measurement}_2(mblock, k) = \frac{\langle Cov_{block}(mblock, k) \mid Cov_{block}(mblock, k+1) \rangle}{\|Cov_{block}(mblock, k)\| \|Cov_{block}(mblock, k+1)\|}$$

With $Cov_{block}$ the block covariance matrix 1050, m the number of the sub-signal 1022 and k the number of the bin 1031 and:

$$\langle A \mid B \rangle = \text{Trace}(A^T \times B)$$

$$\|A\| = \sqrt{\text{Trace}(A^T \times A)}$$

With A and B two complex matrices of same dimensions.

Thus, the values of the first 1061 and second co-linearity measurements 1062 are comprised between 0 and 1: if the block covariance matrices 1050 are orthogonal, the first 1061 and the second co-linearity measurements 1062 are equal to 0 and if the block covariance matrices 1050 are co-linear, the first 1061 and second co-linearity measurements 1062 are equal to 1.

To study the co-linearity of the block covariance matrices 1050 according to the time blocks 1051 and the bins 1031, a co-linearity product 1063 is realised between the first 1061 and second 1062 co-linearity measurements during the detection step 106 for each bin 1031.

In order to be able to detect the transmitters 300, a detection threshold 1064 is chosen. This depends on the product between the frequency resolution 1032 and the time block 1051. Indeed, the higher this product, the bigger the time-frequency boxes and thus the more it becomes difficult to discriminate the transmitters from ambient noise: it is thus desirable to have a higher detection threshold value 1064 to guard against false alarms or detections triggered when there is no transmitter.

The detection threshold 1064 is also chosen to guard against false detections triggered by the acquisition signals 1010 but not having to be taken into account. The detection threshold 1064 may for example be positioned at a value greater than 0.90.

Once the detection threshold 1064 has been chosen, for each time block 1051, the number of bins 1031 of which the value of the co-linearity product 1063 is above the threshold 1064 is noted whereas the value of the co-linearity product 1063 of the bin preceding it is below the threshold 1064: these bins 1031 are start bins 1065. The principle of detection by thresholding is represented in FIG. 6.

Thus, the number of start bins 1065 of a time block 1051 gives the number of transmitters of which the signals have been captured over the sub-time of the acquisition time 1011 corresponding to the time block 1051. For example, if three start bins 1065 are found on the second time block 1051, three transmitters 300 have been detected that were transmitting over the sub-time of the acquisition time 1011 corresponding to the second time block 1051.

After detection, the transmitters 300 may be characterised to provide parameters of interest such as the central frequency, the band width or the power of the signal associated with each transmitter 300. It is also possible to localise the transmitters 300 using for example goniometry algorithms or instead to monitor the temporal evolution of the transmitters 300, time block by time block.

Having described and illustrated the principles of the invention with reference to various embodiments, it will be recognized that the various embodiments can be modified in arrangement and detail without departing from such principles. It will be appreciated that the different concepts and aspects of the invention described above can be implemented, for example, using one or more processors, modules, machine executable instructions, computers and/or servers. It should be understood that the concepts and aspects of the invention described herein are not related or limited to any particular type of computing environment, unless indicated otherwise. Various types of specialized computing environments may be used with or perform operations in accordance with the teachings described herein. Elements of embodiments shown in software may be implemented in hardware and vice versa.

One or more devices, processors or processing devices may be configured to carry out the function(s) of each of the elements and modules of the structural arrangement described herein. For example, the one or more devices, processors or processing devices may be configured to execute one or more sequences of one or more machine executable instructions contained in a main memory to implement the method(s) or function(s) described herein. Execution of the sequences of instructions contained in a main memory causes the processors to perform at least some of the process steps or function(s) of the elements described herein. One or more processors in a multi-processing arrangement may also be employed to execute the sequences of instructions contained in a main memory or computer-readable medium. In alternative embodiments, hard-wired circuitry may be used in place of or in combination with software instructions. Thus, embodiments are not limited to any specific combination of hardware circuitry and software. The term "computer-readable medium" as used herein refers to any medium that participates in providing instructions to a processor for execution. Such a medium is non-transitory and may take many forms, including but not limited to, non-volatile media, volatile media, and transmission media. Non-volatile media include, for example, optical or magnetic disks. Volatile media include dynamic memory. Transmission media include coaxial cables, copper wire and fiber optics. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read. Various forms of computer readable media may be involved in carrying one or more sequences of one or more instructions to processor for execution.

Computer programs comprising machine executable instructions for implementing at least one of the steps of the methods, and/or aspects and/or concepts of the invention described herein or function(s) of various elements of the structural arrangement described herein can be implemented by one or more computers comprising at least an interface, a physical processor and a non-transitory memory (also broadly referred to as a non-transitory machine readable or storage medium). The computer is a special purpose computer as it is programmed to perform specific steps of the method(s) described above. The non-transitory memory is encoded or programmed with specific code instructions for carrying out the above method(s) and its/their associated steps. The non-transitory memory may be arranged in communication with the physical processor so that the physical processor, in use, reads and executes the specific code instructions embedded in the non-transitory memory. The interface of the special purpose computer may be arranged in communication with the physical processor and receives input parameters that are processed by the physical processor.

It will be appreciated by one skilled in the art that the disclosed arrangements and methods described herein represent a solution to the technological problem described above.

The invention claimed is:

1. A method for detecting the presence of one or more radioelectric transmitters in an environment, the method being implemented by a device comprising a computing unit and an antenna array comprising a plurality of antennas adapted to carry out acquisitions simultaneously from the environment in the form of acquisition signals during an acquisition time and to receive and to transmit simultaneously the acquisition signals in digital form to the computing unit, the computing unit being able to carry out processings on the digitised signals, the method comprising:

for each antenna,
  receiving and digitising the acquisition signal in the form of a digitised signal and transmitting the digitised signal to the computing unit;
  generating a plurality of spectra from the digitised signal having a chosen frequency resolution, a spectrum comprising a plurality of points, each point being assigned to a number called bin;
for each bin, grouping together the spectra of the different antennas corresponding to the bin and computing a covariance matrix;
grouping together the covariance matrices of which the associated spectra correspond to a same time block, a time block being defined as a sub-time of the acquisition time, to form block covariance matrices;
computing a first measurement of co-linearity of the block covariance matrices between two consecutive time blocks and a second measurement of co-linearity of the block covariance matrices between two consecutive bins of a same time block;
detecting one or more radioelectric transmitters by carrying out the following steps:
  for each bin, computing the product between the first and the second measurement of co-linearity to form a co-linearity product;
  for each time block:
    noting the number of start bins for which the co-linearity product passes above a threshold, that is to say that the value of the co-linearity product for a start bin is above the threshold and the value of the co-linearity product for the bin preceding this start bin is below the threshold;
    the number of start bins gives the number of radioelectric transmitters detected in the time block.

2. The detection method according to claim 1, wherein generating spectra comprises the following sub-steps:
splitting the digitised signal into a plurality of windows, so as to form digitised sub-signals;
for each digitised sub-signal, computing a discrete Fourier transform to obtain a spectrum.

3. The detection method according to claim 2, wherein generating spectra comprises a pre-processing sub-step to format the digitised signal before the splitting sub-step.

4. The detection method according to claim 2, wherein each window overlaps a part of the preceding window.

5. The detection method according to claim 2, wherein generating spectra comprises a sub-step of weighting the digitised sub-signals before the computation of the discrete Fourier transforms of each digitised sub-signal.

6. The detection method according to claim 1, wherein the block covariance matrices are formed by averaging the values of the covariance matrices corresponding to a same time block.

7. The detection method according to claim 1, wherein the first measurement of co-linearity is a normalised scalar product measurement between the block covariance matrix of a first time block and the block covariance matrix of a second time block, the second time block being the time block following the first time block.

8. The detection method according to claim 1, wherein the second measurement of co-linearity is a normalised scalar product measurement between the block covariance matrix of a first bin and the block covariance matrix of a second bin, the second bin being the bin following the first bin.

9. The detection method according to claim 1, wherein the value of the chosen threshold depends on the chosen frequency resolution and on the acquisition sub-time corresponding to a time block.

10. A device enabling the implementation of a method according to claim 1, comprising:
an antenna array comprising a plurality of antennas adapted to receive simultaneously and to digitise acquisition signals to transmit them to a computing unit in the form of digitised signals;
a computing unit adapted to carry out computation and detection functions on the digitised signals.

11. A non-transitory computer readable medium comprising instructions which, when the instructions are run on a computer, lead said computer to implement the method according to claim 1.

* * * * *